April 28, 1970    A. B. WESLER    3,509,303

METHOD OF AND APPARATUS FOR WELDING

Filed Feb. 16, 1968    3 Sheets-Sheet 1

INVENTOR
ALLAN B. WESLER

BY Edward G. Roe
ATTORNEY

April 28, 1970  A. B. WESLER  3,509,303
METHOD OF AND APPARATUS FOR WELDING
Filed Feb. 16, 1968  3 Sheets-Sheet 2
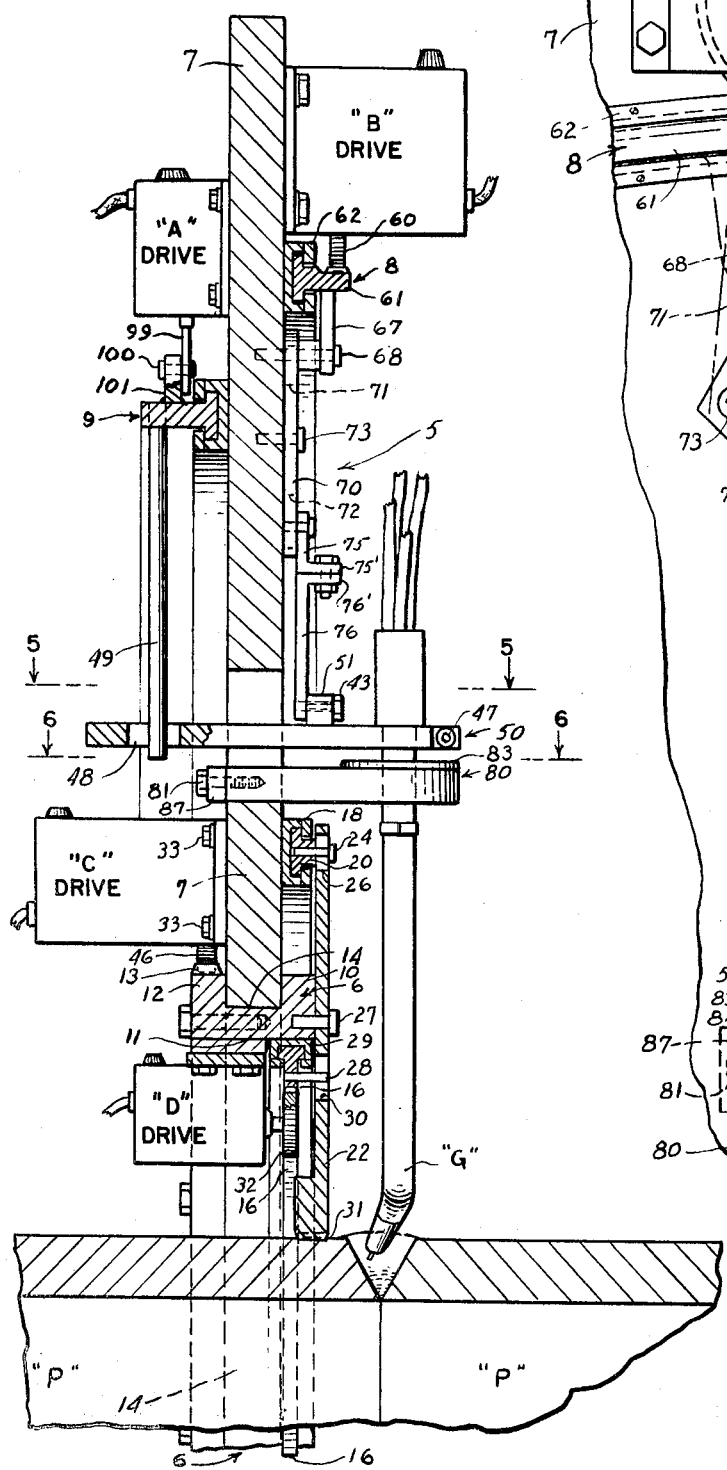
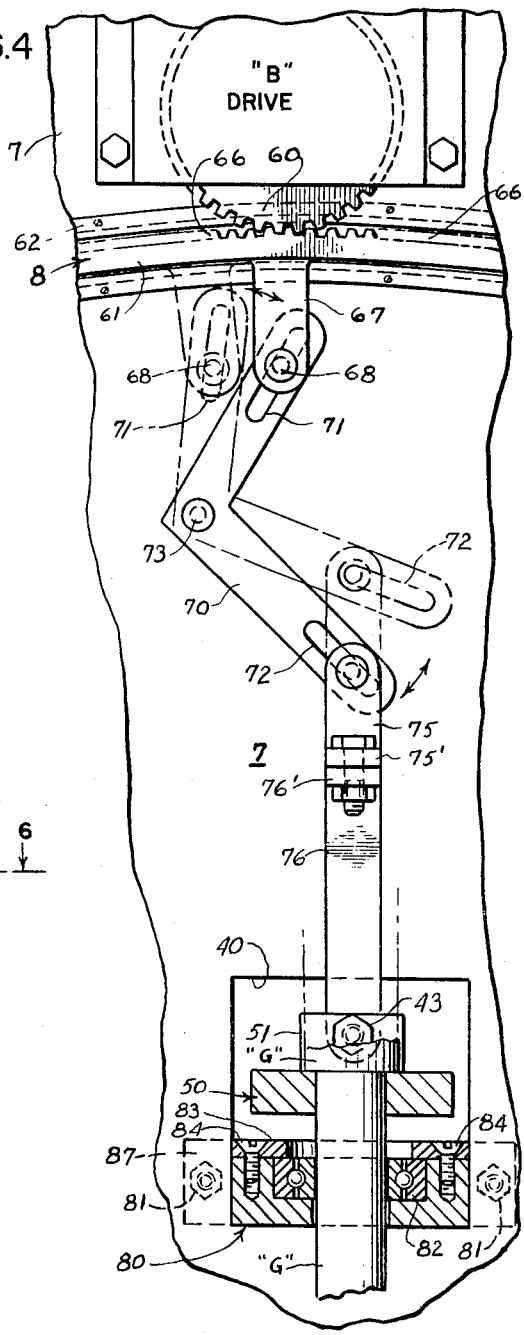
INVENTOR
ALLAN B. WESLER
BY Edward G. Roe
ATTORNEY

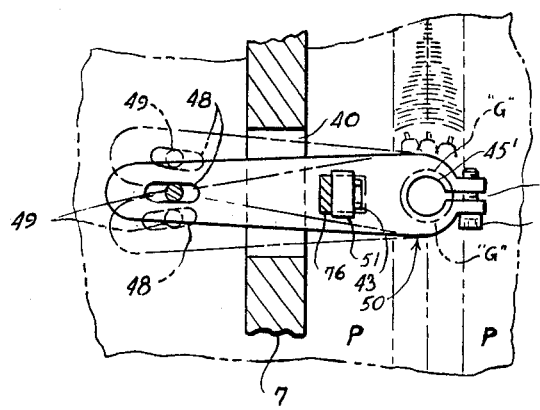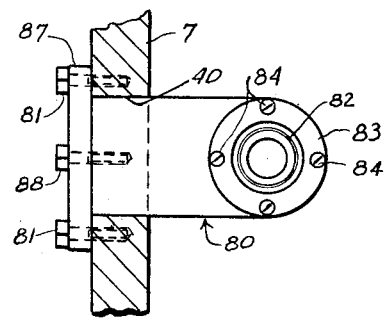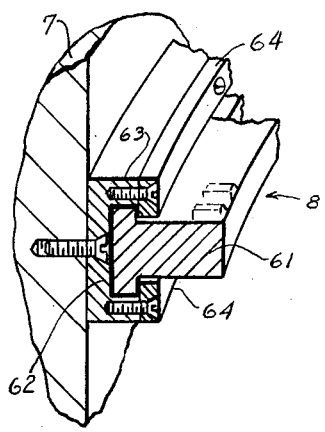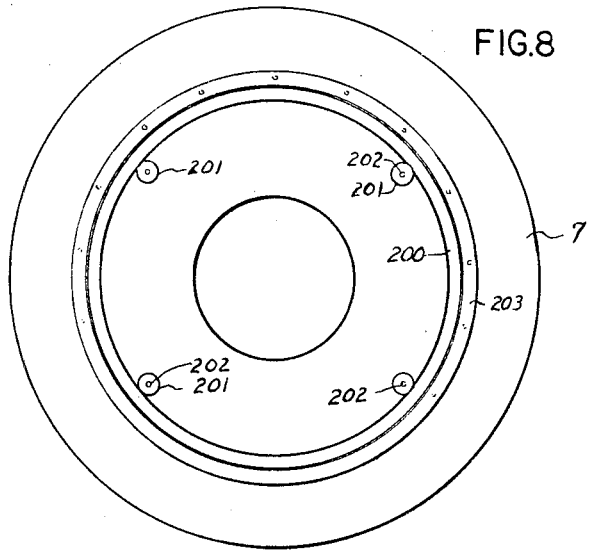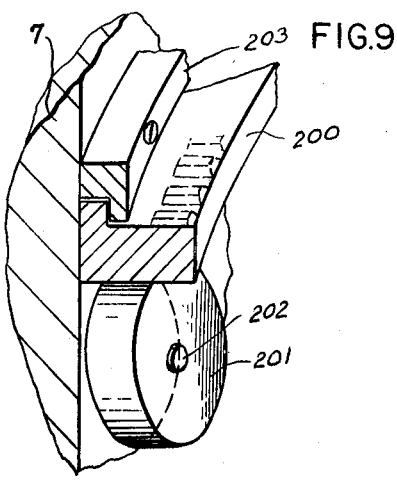

United States Patent Office 3,509,303
Patented Apr. 28, 1970

3,509,303
METHOD OF AND APPARATUS FOR WELDING
Allan B. Wesler, 1070 Park Ave.,
New York, N.Y. 10005
Filed Feb. 16, 1968, Ser. No. 706,055
Int. Cl. B23k 9/12
U.S. Cl. 219—60                                    11 Claims

ABSTRACT OF THE DISCLOSURE

A method and apparatus for the welding of pipe by the use of a plurality of welding guns carried on an assembly that is portable and adapted to be affixed to the pipe's surface at a point adjacent to the abutting ends of the pipe to be welded. The welding ring is manufactured as a solid ring to slip over the pipe assembly, or it may be, if desired, made as a split ring so that it is adapted to be opened and closed adjacent to the weld area. Each welding gun of the plurality of welding guns is mounted on the assembly for predetermined movement in a concentric path around the periphery of the weld zone with appropriate associated controls and mechanisms designed to stop the guns at a given point, and return them back along their arcs, thus providing an oscillating motion around the periphery of the weld zone. The oscillating motion, is modulated by a longitudinal motion back and forth along the pipe. The frame or carriage of my invention may also be employed to hold cutting, grinding, purging or other appropriate tools.

Figure 1:
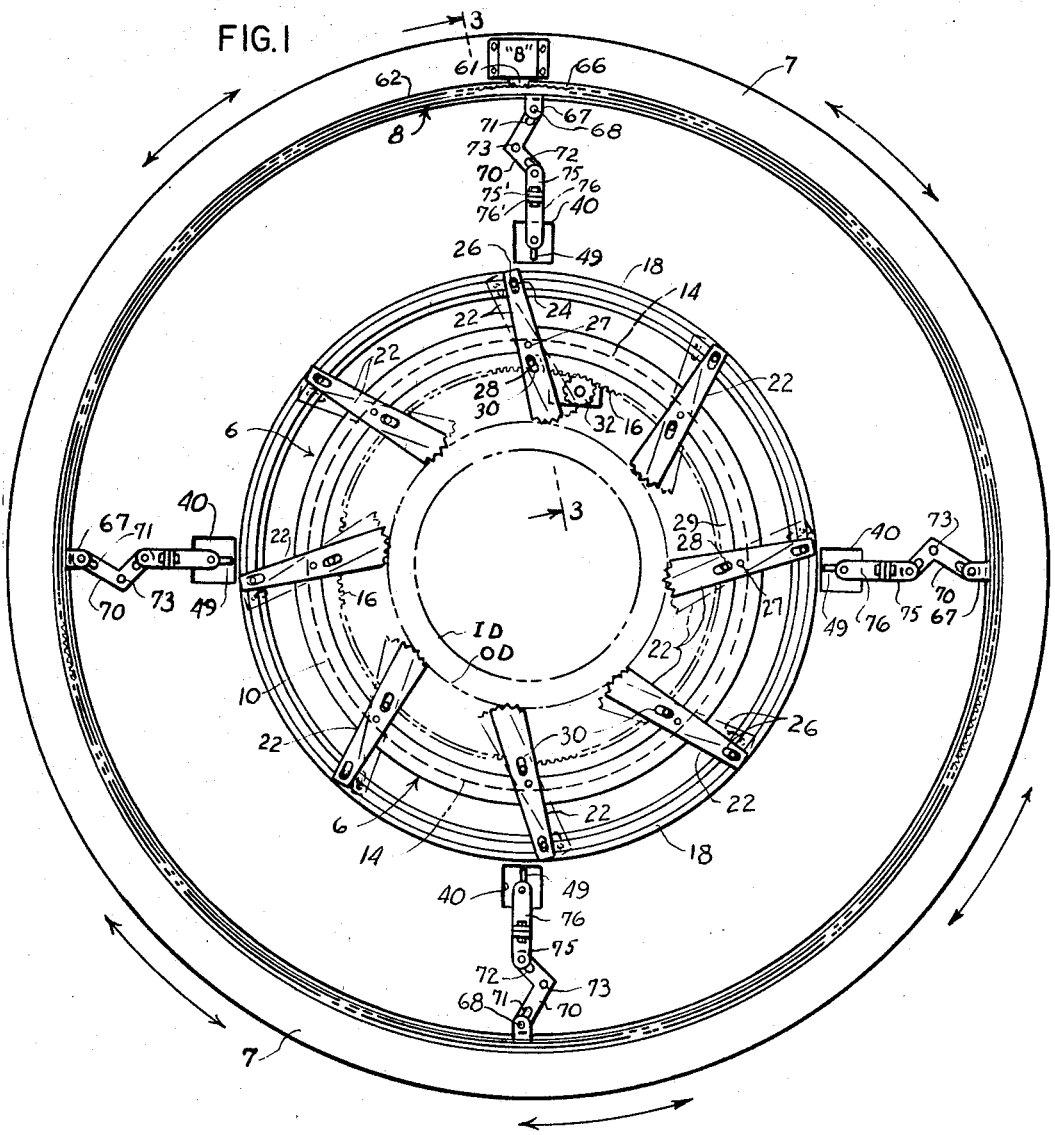

My invention generically relates to automatic welding of pipe.

Heretofore automatic welding of pipe has been performed in either of two methods:

(a) The pipe assembly to be located under a welding gun held in a fixed position, and (b) For a welding gun to travel around the weld of a stationary assembly.

The disadvantages of the first of the two methods named above are that many of the pipe configurations do not permit the assembly to be rotated using commercial rotators or the weld is not accessible to a fixed welding station during the rotation of the assembly.

The second method named has the inherent disadvantage in that the weld deposition rate is not of sufficient depth or magnitude to justfy the time and expense of fixturing for the weld process; also this method has never been applicable to the welding of heavy wall pipe because each rotation of the gun around the pipe can wrap the various service lines servicing each gun around the pipe near the weld zone. This wrapping obscures the vision of the operator, exposes the various service lines to damage in the hot pipe area, consumes a great deal of time to remove and frequently damages the lines by coiling and uncoiling, adding significantly to the mechanics required for efficient gun rotation. Also if the wire is fed through a line to the gun, this would cause wastage of the weld wire. Also, welding conditions on the weld zone of a pipe differ for each segment, as different weld conditions are encountered.

My invention overcomes the above disadvantages in that the pipe assembly to be welded can be placed on a fixture or lie in any natural position which provides clearance from adjacent structures required for welding guns to rotate around the weld.

As will be understood from an explication of the invention hereinafter, the guns are intended to be carried on a carriage that may be portable and affixed to the pipe surface or part of a support unit, that will center the weld ring about the pipe surface.

The ring is manufactured either as a solid welding ring designed to fit and slip over the end of the pipe assembly or as a split ring adapted to be opened and closed around the pipe weld area. The welding guns of my invention are of the conventional type, but are adapted to travel in a concentric motion around the periphery of the weld zone with associated controls and linkage designed to stop the rotation of the guns in tandem at any desired point along the weld zone, and to return the guns in the reverse direction of their arc of travel, an oscillating motion in unison of the guns around the periphery of the weld zone.

My invention has for its principal purposes and accomplishes the following results which constitute advantages over existing apparatus and processes of welding:

(1) I have freed the carriage to preclude wrapping of the cables and service wires of the welding guns around the pipe.

(2) By oscillation and longitudinal motion of the plurality of the guns simultaneously, a desirable deposition of the weld material to weld the pipes, is accomplished.

(3) Each gun of the plurality of welding guns travels the same arc radius and is suitably controlled to vary the amount of longitudinal motion of each gun, and can be individually and separately controlled to effectively weld the particular segment of the weld zone.

(4) By providing a plurality of guns around the pipe to be welded, an even heat distribution results, thus preventing warping.

(5) Any required modulated motion of each gun, as well as cutting, grinding, purging or shielding operations can be provided on the same setup.

(6) By individually controlling the motion and travel in unison of the plurality of welding guns in their oscillating motion around the arc weld, I achieve heavy deposition of weld metal on the butt ends of the pipe without rotation of the work.

These and other advantages, purposes, and features of the invention will be manifest from the following description of a preferred embodiment thereof, selected for purposes of illustration and shown in the accompanying drawings.

The fundamental character of the inventive concept makes it advisable that some of the terms hereinafter referred to be generally defined:

Oscillation.—The motion of the weld guns around the periphery of the pipe and back again to the starting position.

Longitudinal motion.—The motion of the weld guns back and forth over the weld area in a direction parallel to the axis of the pipe.

Modulated motion.—The combination of oscillation and longitudinal motion, occurring at the same time.

Deposition.—Means the metal deposited by the welding gun during the welding process.

The above and hereinbefore stated accomplishment and purposes of the invention will be manifest after a reading and understanding of the specification and claims.

Briefly described the invention comprises apparatus for carrying out the method which includes moving welding guns mounted at spaced intervals around the apparatus with controls for predetermined movement. Associated controls and mechanisms are designed to stop the rotation at a given point and return the weld guns back along their arc, provide a simultaneous oscillating and weaving motion resulting in even and perfect deposit of the welding metal around the periphery of the weld zone, and economy of operation.

In the drawings:

FIG. 1, illustrates a front elevation of the apparatus.

Figure 2:
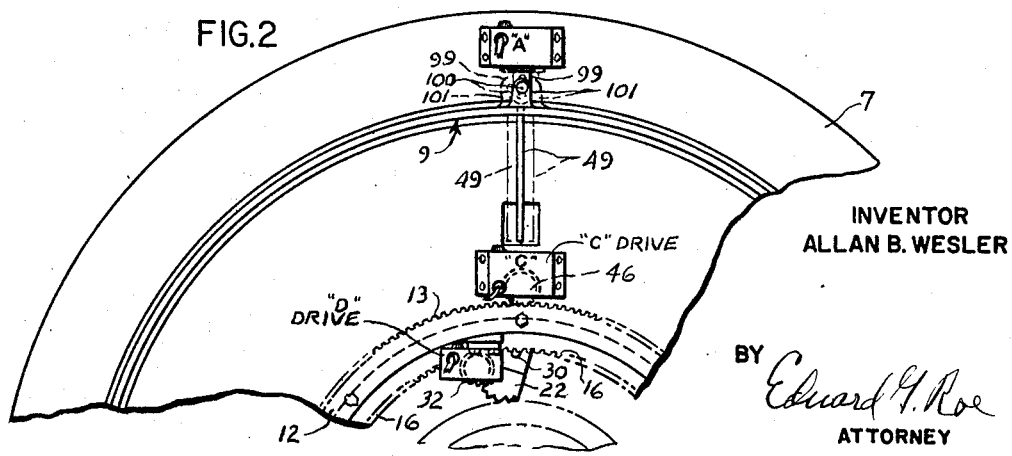

FIG. 2, a partial rear elevational view of the apparatus.

FIG. 3, a section taken substantially through line 3—3 of FIG. 1.

FIG. 4, Partial enlarged front elevational view of raising linkage.

FIG. 5, section view taken on line 5—5 of FIG. 3.

FIG. 6, a section view taken on line 6—6 of FIG. 3.

FIG. 7, a fragmentary perspective section showing structural details of a track.

FIG. 8, a front elevational of modified form of track.

FIG. 9, fragmentary sectional perspective of modified form of track.

The same numerals of reference are employed throughout the drawing to indicate like parts, and it is to be understood the details of the apparatus I have designed for carrying out my method of welding show but one of the four welding gun carriages, mounts and apparatus, the other three being similarly mounted and controlled. And as hereinbefore stated there may be six or more or less than four equi-distantly spaced-apart guns for oscillating about the weld zone.

Referring to the drawings, in particular FIG. 3, an example of the work to be welded by my invention is indicated in FIG. 3 which illustrates the meeting butt ends of pipe P with a conventional V slot.

The apparatus is generally indicated by the numeral 5 and comprises the following cooperating rings, one fixedly positioned on the pipe and the others mounted for cooperating movement:

positioning ring 6
main frame 7, also referred to as the oscillating frame
raising ring 8
modulating ring 9

The positioning ring 6 comprises a ring-like circumferential body portion 10, shouldered at 11 with demountable band 12, which, in conjunction with shoulder 11, forms a continuous groove 14 in ring 6 in which is rotatably mounted the main frame 7. As illustrated in FIG. 3 band 12 carries integral gear track 13 with C drive gear 46 meshing with track 13 transmitting oscillating motion.

Track 18 receives ring 20, to which legs 22 are pinned as at 24 through a slot 26 and the said legs are pivoted and attached to the ring 6 by pin 27 with their opposite and lower legs forming arced teeth 31.

Track 29 receives ring gear 16 from which pin 28 extends into slot 30 in the lower part of legs 22.

Meshing with ring gear 16 I provide gear 32 driven by the drive denoted D.

D drive is adapted to move ring gear 16 either clockwise or counterclockwise, by which movement legs 22, fulcrumed at 27, fix the positioning ring in a secure position on the pipe with the teeth 31 of legs 22 gripping the pipe outside surface and with the welding guns of the apparatus over the welding zone of the butt ends of the pipe to be welded. There may be more or less number of legs 22 in different sizes of the apparatus to fit over varied sizes of pipe.

For oscillatory travel over the weld zone, I mount in groove 14 a disc-like main frame 7, and secured thereto by bolts 33 is the C drive with gear 46 meshing with gear track 13 on the top of band 12, as shown in FIG. 3. C drive may be suitably controlled to automatically reverse the oscillatory travel of each gun when the main frame 7 reaches the limit of the arc travel or there may be (not shown), a plurality of spaced stops along the peripheral groove 14.

Gun raising ring 8 guided by trackway 62, is actuated by means which I refer to as B drive, this drive including suitable controls, is reversible, with inching ability in either direction, and controlled manually for coarse adjustment.

B drive connects with pinion gear 60 which meshes with ring gear 66 in rotating ring 8 as illustrated in FIG. 4, while beneath ring 8 and integral therewith extends leg 67, and depending linkage the purpose and description of which will be referred to hereinafter.

As illustrated in FIGS. 3 and 4, main frame 7 is apertured as at 40 to receive weaving gun carriage 50 and gun mount 80 in spaced and superposed relationship.

The gun carriage 50 is secured to the lower end of lug 51 by bolt 43, and the linkage 76 includes at its upper end, a right angled bracket 76' journaled to a companion bracket 75 at 75' above.

The outer end of carriage 50 is bifurcated as at 45 carrying Allen Screw 47 to secure the gun G when positioned, and, as depicted in FIG. 5, can oscillate in a horizontal plane within the confines of aperture 40.

Carriage 50 is medially bored as at 45', while the opposite end is slotted at 48 to receive rod 49.

Cooperating with gun carriage 50 in supporting the welding gun G is mount 80, one end of which extends through aperture 40 and is fastened to main frame 7 as by bolts 81 through plate 87 with bolt 88 securing plate 87 to the mount 80. The distal end is vertically apertured to receive bearing 82 and a bearing cap 83 fastened by conventional cap screws 84. Reverting to the depending leg 67, this is attached to L shaped arm 70 by pin 68 through slot 71 with the opposite end of arm 70 slotted as at 72.

In the form of my invention exhibited here, arm 70 is medially pivoted to main frame 7 by pin 73.

With the lower slotted end of arm 70 coupled to bracket 75 as shown in FIG. 4, the actuation of drive B to move ring 8 in a counter-clockwise direction causes the linkage to move from that position depicted in solid line in FIG. 4 to the raised phantom position, achieved by the arm 70 pivoted about the stationary pin 73 on the main frame, raising the linkage and gun carriage 50. As illustrated in FIGS. 3 and 4 and 7 raising ring 8 is fabricated with T-shaped laterally extending guide 61 received in trackway 62, the latter comprising U-shaped member 63 and demountable plates 64, to preclude displacement of raising ring 8.

As shown in FIG. 3, A drive with associated controls and control knob and lead wires is affixed by conventional means to main frame 7. Extending from the A drive is a slotted lever arm 99 swinging through pin 100 and lug 101 clockwise or counter-clockwise.

A drive is capable of moving ring 9 back and forth, with adjustable width of oscillation and dwell at each end of oscillation.

As illustrated in FIG. 5, in broken line, the adjustable feature of A drive limits or increases the weaving action— thus as the gun G is raised by raising ring 8, A drive simultaneously is utilized to broaden the sweep of the weave, and a heavier deposition of weld metal accomplished in the V of the weld.

It is apparent that while one drive operates and controls a plurality of guns at each gun station—there are provided a plurality of rods 49 connecting with ring 9 and engaging each gun carriage as hereinbefore described.

The structural details of the tracks are illustrative and not limiting. For example, there is shown in FIG. 8, a simplified modification of track which may be utilized. Here a ring 200 is supported by a plurality of wheels 201 which are adjustably secured to frame 7 by shaft 202. The ring 200 is removably secured to frame 7 as by ring 203, and attached to the frame by conventional screws.

In carrying out my invention I propose that A, D, and B drives may be operator controlled while drive C may be automatically controlled.

The manifold purposes and accomplishments of my invention have been enumerated. It is manifest, however, that a butt joint pipe weld achieved by simultaneous oscillation of a plurality of spaced weld guns, each moving across a segment of the periphery of the joint, will effect a superior weld through the controlled motion of each gun, at a great saving in time and resulting economies.

While I have selected for the illustrated embodiment a main frame having four spaced apertures for mounting four gun carriages, gun mounts and welding guns spaced 90° from each other, this does not import a limitation of the invention to this setup, as the invention may be carried on in other ways, for example, a carriage mounting 6 welding guns each spaced 60° from each other, and other combinations.

Various other modifications such as friction drives, may suggest themselves to those skilled in the art without departing from the spirit of the invention. Hence I do not wish to be restricted to the specific forms mentioned except to the extent indicated in the appended claims, which are to be interpreted as broadly as the state of the art will permit.

I claim:

1. Apparatus for welding two pieces of pipe together by a circular weld around the pipe peripheries comprising: a positioning ring secured to one of the pipes to be welded and enclosing the pipe in axial alignment therewith, said ring formed with an annular groove; an oscillating frame including an annular shoulder positioned in said annular groove and adapted to oscillate about the pipe; a plurality of spaced weld guns mounted on the oscillating frame for applying molten metal to a weld groove between the ends of the pipes; means comprising a raising ring slidably supported by the oscillating frame and coupled to the weld guns for moving the guns away from the pipes during a welding operation; and means comprising a modulating ring also slidably supported by the oscillating frame for rocking the weld guns to move the gun back and forth over the weld at the same time the oscillating frame moves the guns around the pipe periphery.

2. Apparatus as claimed in claim 1 wherein the positioning ring is coupled to a plurality of spaced legs for turning the legs into and out of a clamping position.

3. Apparatus as claimed in claim 2 wherein a first electric motor is coupled between the positioning ring and a plurality of pins in the legs for moving all the legs at the same time to secure the positioning ring on the pipe in a concentric position.

4. Appaartus as claimed in claim 1 wherein the oscillating frame is coupled to the positioning ring by a second electric motor whereby the motor controls the motion of the oscillating frame and the weld guns.

5. Apparatus as claimed in claim 1 wherein the weld guns are each rotatably and slidably supported on a bracket secured to the oscillating frame.

6. Apparatus as claimed in claim 5 wherein the weld guns are each secured to a pivoted rod for turning the guns to provide a modulating motion of the gun nozzles.

7. Apparatus as claimed in claim 6 wherein said pivoted rods are coupled to a third electric motor for moving the guns.

8. Apparatus as claimed in claim 6 wherein the raising ring is slidably mounted on a groove formed in the oscillating frame, and a plurality of radial legs are carried by the raising ring for coupling arrangement to pivoted L-shaped arms.

9. Apparatus as claimed in claim 6 wherein the means comprising a raising ring is coupled to a fourth electric motor for turning the ring to raise or lower the weld guns.

10. Apparatus as claimed in claim 6 wherein means are provided for increasing the modulating motion of the weld guns as the guns are raised away from the weld during a welding operation.

11. Apparatus as claimed in claim 6 wherein means are provided for separately controlling the modulating motion of each gun.

References Cited

UNITED STATES PATENTS 3,179,781   4/1965   Ross et al. _____ 219—60.1

JOSPEH V. TRUHE, Primary Examiner

L. A. SCHUTZMAN, Assistant Examiner

U.S. Cl. X.R.

219—125